United States Patent [19]

Pettit

[11] Patent Number: 4,693,508

[45] Date of Patent: Sep. 15, 1987

[54] TRACK ASSEMBLIES FOR MOUNTING COVERS AND CANOPIES ON PICKUP TRUCK BEDS

[76] Inventor: Dorothy E. Pettit, 18219 46th Pl. South, Seattle, Wash. 98188

[21] Appl. No.: 912,056

[22] Filed: Sep. 26, 1986

[51] Int. Cl.$^4$ .............................................. B60P 7/00
[52] U.S. Cl. .................................... 296/100; 296/105
[58] Field of Search ............... 296/105, 100; 16/87 R, 16/94 R, 95 R; 49/413

[56] References Cited

U.S. PATENT DOCUMENTS

| | | | |
|---|---|---|---|
| 3,901,548 | 8/1975 | Seaman, Jr. | 296/100 |
| 4,199,188 | 4/1980 | Albrecht et al. | 296/100 |
| 4,252,363 | 2/1981 | Rodrigue | 296/100 |
| 4,406,493 | 9/1983 | Albrecht et al. | 296/100 |

Primary Examiner—Robert R. Song
Attorney, Agent, or Firm—Quaintance, Murphy & Presta

[57] ABSTRACT

Cooperating male and female track assemblies associated with otherwise conventional pickup truck body open beds and covers or canopies so that a cover or canopy may be easily alid onto and off of the truck body bed. The male and female tracks have a variety of cross-section configurations and one or the other or both of the tracks have an elongate channel formed in an exposed surface through which conventional headed fasteners are inserted with the fasteners heads received entirely within the channel or channels so that any interference fit between the tracks is prevented and the hitherto requirement for countersunk fasteners is eliminated.

24 Claims, 12 Drawing Figures

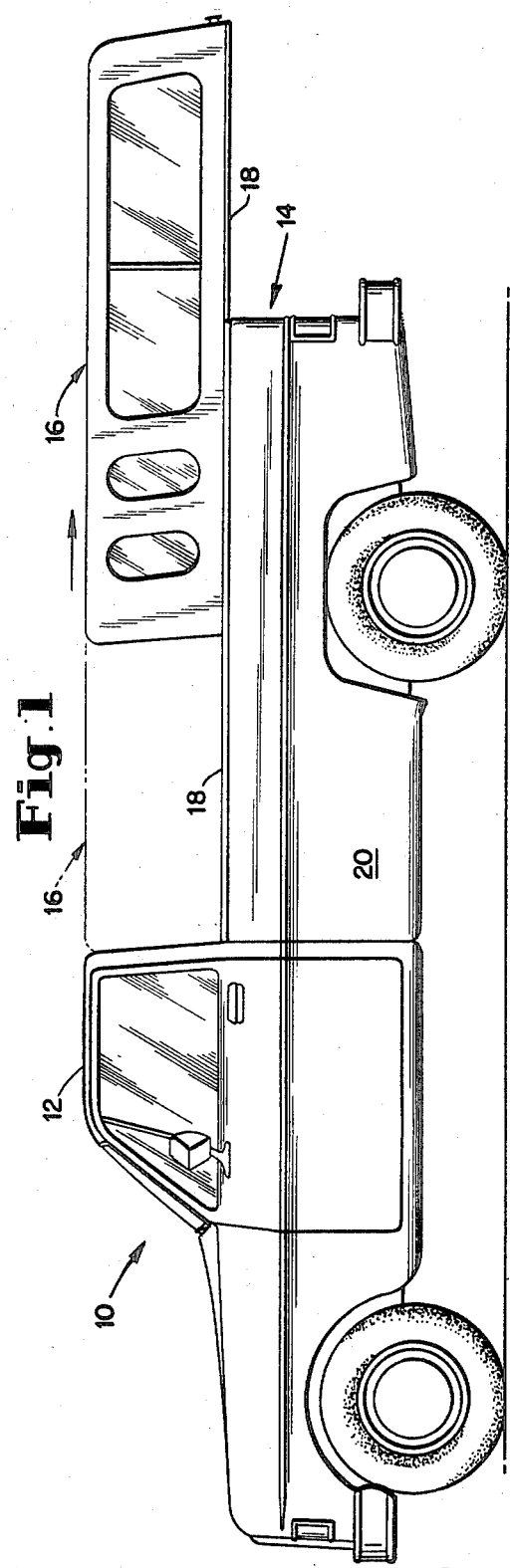
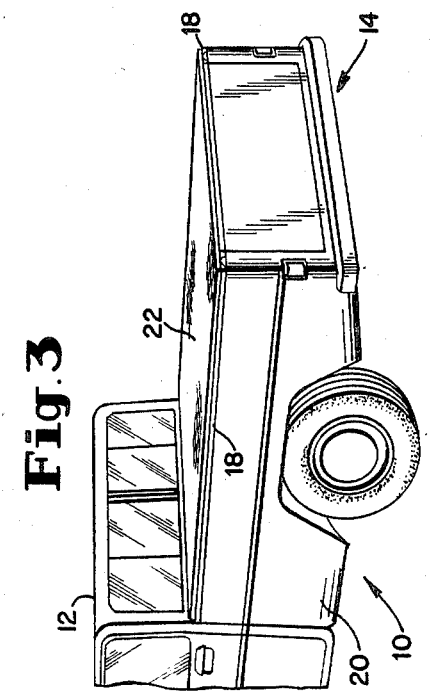
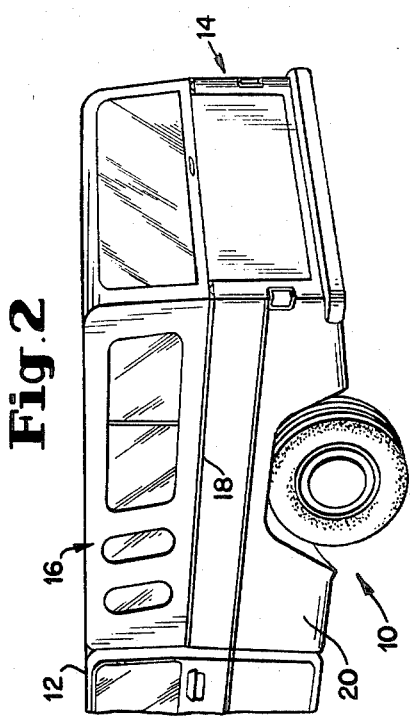

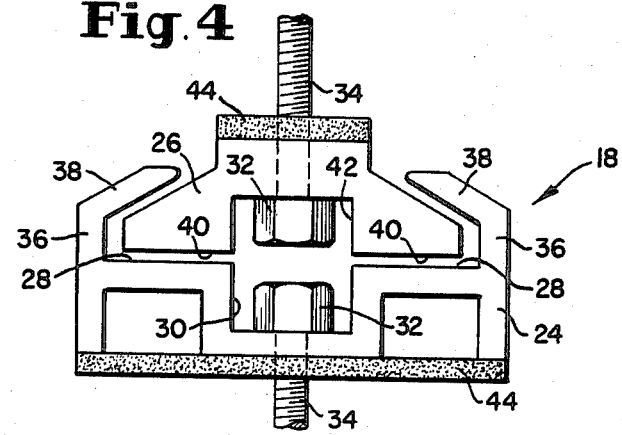
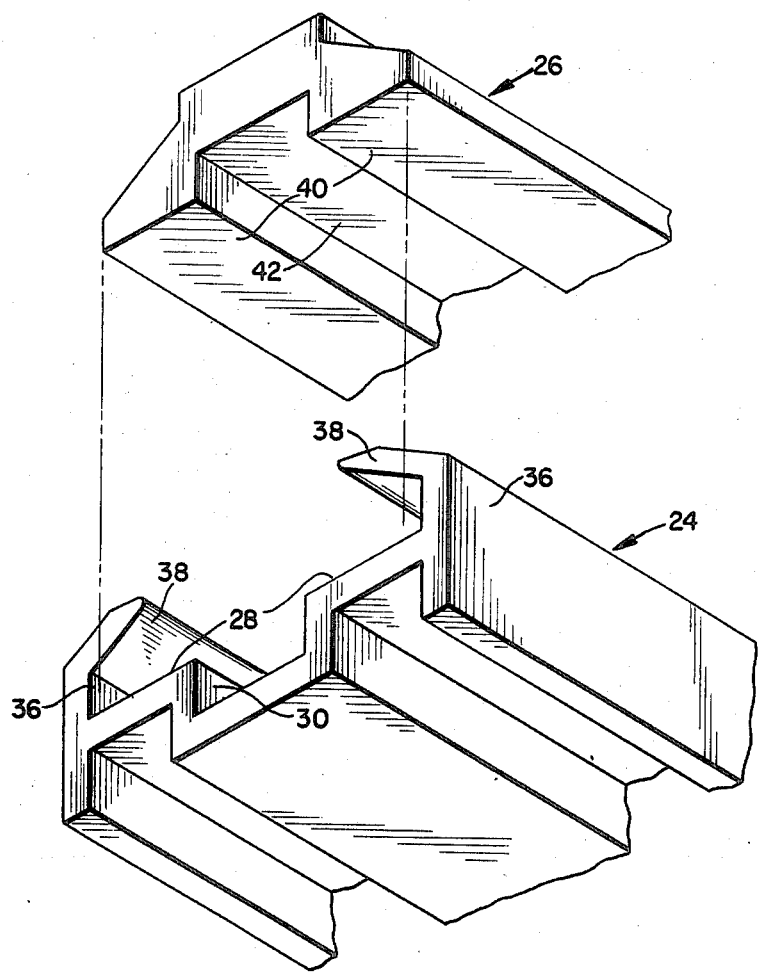

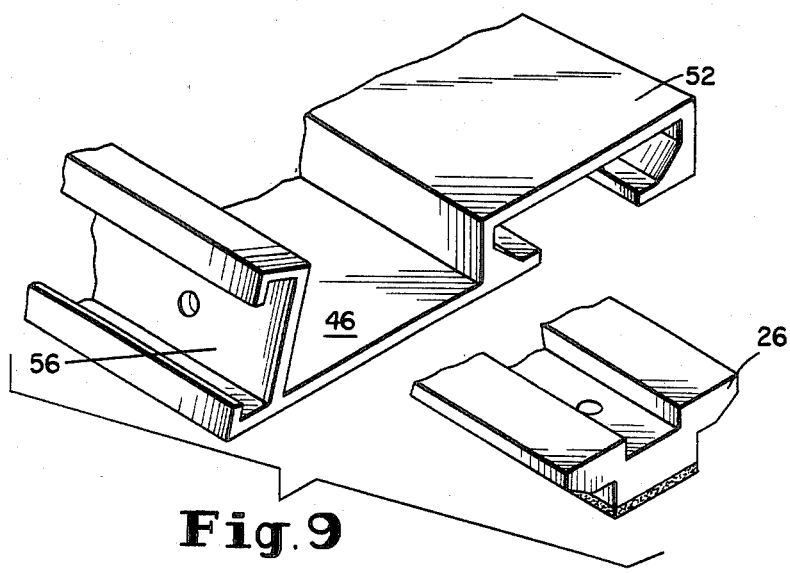
Fig. 9
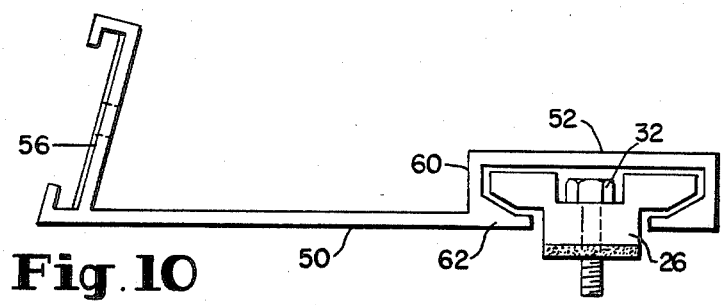
Fig. 10
Fig. 11
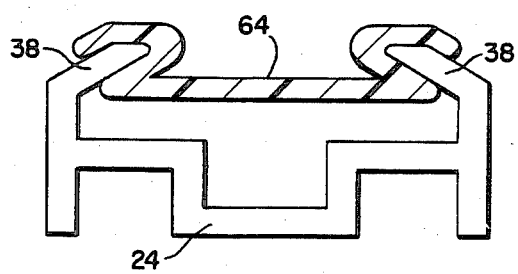
Fig. 12
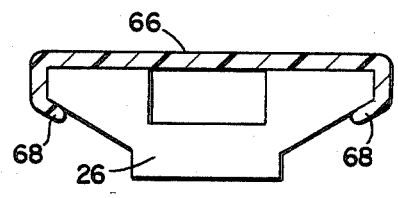

TRACK ASSEMBLIES FOR MOUNTING COVERS AND CANOPIES ON PICKUP TRUCK BEDS

BACKGROUND OF THE INVENTION

This invention relates generally to releasable mountings for attaching covers and canopies to pickup truck beds and, more specifically, to improved track assemblies having interfitted male and female tracks to greatly facilitate mounting and removal of covers and canopies from pickup truck beds.

Conventionally, covers or canopies are attached to the beds of pickup trucks by screws, bolts, latches or other suitable fasteners. Removal and replacement of such covers or canopies is rather difficult and usually a two person undertaking. To remove such a conventionally mounted canopy or cover requires removal of all of the fasteners securing the cover or canopy to the bed. Then, the cover or canopy must be lifted in order to clear the bed. Reattachment or reassembly of the cover or canopy on the pickup truck bed is equally cumbersome and time consuming.

As a preliminary, it is noted that a number of terms are used in the art to describe covers or canopies for pickup truck beds. Currently, there are, generally speaking, two types of covers or canopies. One type is either a single or multiple segment flat cover which is dimensioned to either partially or, more commonly, completely cover the open bed of a pickup truck. These flat covers rest on the longitudinal, upper surfaces of the vertical side walls of the truck bed and the tailgate of the truck bed either simply abuts the rear edge of the cover or it may be latched to the rear edge of the cover. The other type of conventional cover or canopy is a four or five sided structure having vertical side walls extending upwardly from the sides and tailgate of the pickup truck bed and a roof which is generally in line with the cab of the truck. Commonly, these structures are called canopies on the west coast and caps on the east coast. In other sections of the country, these structures are variously known as covers, shells or toppers.

Prior attempts have been made to device and market track assemblies which would greatly facilitate the assembly and removal of a cover or canopy on to and off of a pickup truck bed. To date, success has been limited both in the original equipment market and in the after market. It has been this inventor's experience that there are several reasons for the situation. The primary ones are cost of the track assembly, difficulty and expense in mounting the track assembly and the need to stock a wide variety of different sizes in order to satisfy the market. For example, it has been found that no less than four different drill patterns and at least eight different sizes of track assemblies are necessary.

The following patents are representative of prior art developments to date. U.S. Pat. No. 3,773,380, issued Nov. 20, 1973 to Robert G. Stockdill discloses a pickup truck with male and female track members for slidably mounting a cover over the otherwise open bed of the pickup truck. The basic idea represented by this patent is sound but the tracks can be difficult to mount without binding and screws or bolts are employed which must be countersunk. This presents an undesirable cost and labor factor. A sliding cover employing a rather expensive roller ball and rail arrangement for slidably mounting the cover is disclosed in U.S. Pat. No. 3,901,548 issued Aug. 26, 1975 to John A. Seaman, Jr. Sliding pickup truck bed covers employing roller and track assemblies are disclosed in U.S. Pat. Nos. 3,897,100 issued July 29, 1975 to Tom Gardner and 4,068,886 issued Jan. 17, 1978 to Richard B. Gostomski. A telescoping cover slidably mounted on a pickup truck bed by a taut cable and grommet assembly is shown in U.S. Pat. No. 4,252,363 issued Feb. 24, 1981 to Wilbrod Rodrigue. U.S. Pat. Nos. 4,199,188 issued Apr. 22, 1980 and 4,406,493 issued Sept. 27, 1983, both to Leonard N. Albrecht et al disclose flat cover sections installed on the open bed of a conventional pickup truck, the cover sections being slidably mounted by short male track sections received within elongate female tracks. A somewhat related disclosure is found in U.S. Pat. No. 3,820,840 issued June 28, 1974 to Jason A. Forsberg. This patent discloses a flexible truck cover slidably mounted on elongate male rails by short, female rail segments.

What the prior art fails to disclose is a suitable, marketable track assembly for slidably mounting a cover or canopy on the bed of a pickup truck, the system being suitable for both the original equipment and after market and which may be easily installed with a minimum of labor and material cost.

SUMMARY OF THE INVENTION

Accordingly, it is a principle object of this invention to provide track assemblies for mounting covers and canopies on pickup truck beds, the assemblies including cooperating, male and female members which are easily installed without need of countersunk screws or bolts, the parts being properly dimensioned so that track portions do not bind when the cover is slid on to and off of the vehicle.

It is another object of the invention to provide track assemblies for slidably mounting covers and canopies on truck beds, each track assembly including a male and female track portion, one of which is formed as an integral extrusion with the otherwise conventional mounting rail or rails of a conventional canopy.

It is a further object of the invention to provide track assemblies for mounting covers and canopies on pickup truck beds which may be marketed as original equipment with the canopy or cover or may be later installed with a minimum of labor and expense.

Yet another object of the invention is to provide track assemblies for mounting covers and canopies on pickup truck beds which are low in cost of manufacture.

BRIEF DESCRIPTION OF THE DRAWINGS

These and further objects and advantages of the invention will become readily apparent by reference to the following drawings in which:

FIG. 1 is a side, elevation view showing a canopy slidably mounted on a pickup truck bed in accordance with the principles in teachings of this invention;

FIG. 2 is a partial, rear perspective view showing the canopy of FIG. 1 in a closed position;

FIG. 3 is a partial, rear perspective view similar to FIG. 2 but showing a flat cover slidably installed on the bed of a pickup truck in accordance with the principles in teachings of this invention;

FIG. 4 is an end view showing one embodiment of a male/female track assembly of this invention;

FIG. 5 is a partial, exploded, perspective view of the male/female track assembly illustrated in FIG. 4;

FIG. 9 is a view similar to FIGS. 6 and 7 but showing another embodiment of the invention;

FIG. 10 is an end view of the embodiment of the invention illustrated in FIG. 9;

FIG. 11 is an end view similar to FIG. 4 but showing the male track member removed and an elongate covering insert installed within the female track member; this elongate cover may be installed when the cover or canopy is removed; and FIG. 12 is an end view similar to FIG. 11 but showing an elongate cover over a male track member.

DESCRIPTION OF THE PREFERRED EMBODIMENTS

Figure 6:
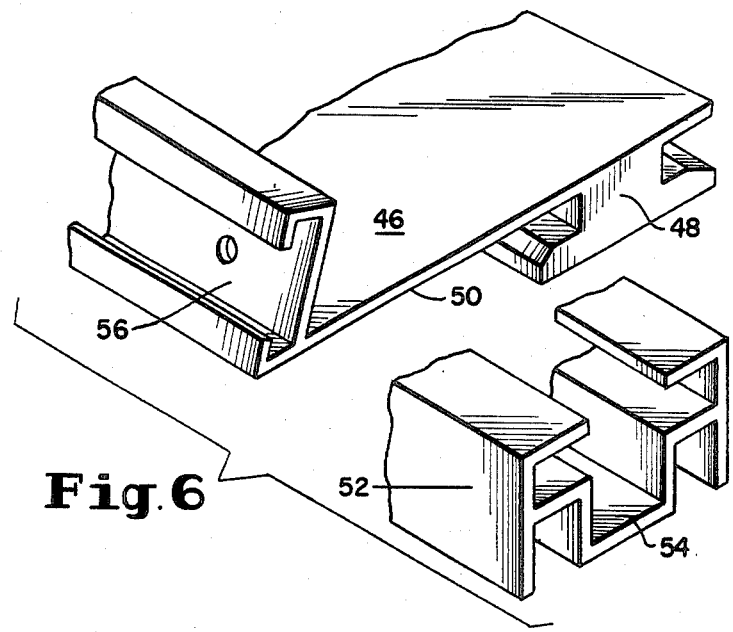
FIG. 6 is a partial, exploded, perspective view of a male/female track assembly wherein the male member is formed integrally with one of the mounting rails of an otherwise conventional canopy.

Referring now to the drawings by reference character, an otherwise conventional pickup truck 10 is illustrated in FIGS. 1-3, the truck including a cab 12 and a rear, open bed 14. In FIG. 1, a canopy 16 is illustrated, that canopy 16 being slidably mounted on the open bed 14 by a track assembly 18 which is constructed in accordance with one of the embodiments of the invention which will be described below. Essentially each track assembly includes two numbers, one of which is a male member and the other is a cooperating, female member. Pairs of one of the members are rigidly attached to the lower, opposed, elongate side edges of the cover or canopy and pairs of the other member of the track assemblies are rigidly secured to the upper surfaces of the upstanding, opposed, longitudinal side walls 20 of the pickup truck bed 14.

FIG. 2 illustrates the canopy 16 slid to a position entirely enclosing the pickup truck bed 14. In FIG. 3, an otherwise conventional flat cover 22 is slidably mounted on the pickup truck open bed 14 in accordance with the teachings of this invention.

Turning now to FIGS. 4-5, one preferred embodiment of the invention will be discussed which is particularly useful for slidably mounting flat covers on pickup truck beds and further may be marketed in kit form for converting a conventional cover or canopy and bed assembly to one in which the cover or canopy is slidably mounted on the bed.

As illustrated in FIG. 4, the track assembly 18 includes a lower, female track member 24 and a cooperating, male track member 26. The female track member 24 is configured to have an interior, flat face or web 28 interrupted centrally by a channel 30 which is dimensioned so that the heads 32 of otherwise conventional fasteners 34 (screws, bolts, etc.) are entirely received within the channel 30. This structure thus assures that there is no interference in the track members sliding with respect to each other. The remainder of female track member 24 includes a pair of upstanding, vertical wall segments 36,36 and inwardly directed, elongate angled lips 38,38 along the upper ends of the side walls 36. As shown, the internal configuration generally presented by these surfaces mates with the exterior configuration of the male track member 26. When viewed upside down, male track member 26 may be said to have a generally T-shaped configuration when viewed from the end or in the cross section when viewed right side up, it conforms to the general outline of a trapazoid. Viewed either way, member 26 includes a lower, flat face portion 40 interrupted centrally by a channel running the full length of face 40. This cannel 40 is similar to channel 30 and is dimensioned so that heads 32 of fasteners 34 may be entirely received there within. Thus, any interference between the sliding members after mounting is avoided. Finally, weatherstripping 44 may be provided.

With further reference to FIG. 4, it will be noted that the male and female track members are only loosely fitted together. The provision of this loose fit is important so that, after assembly and mounting, the cover or canopy may be slid open and closed without the track members binding with one another which, more often than not, has been the case with prior art designs. Also, it should be noted that FIG. 4 is an exact scale drawing showing the members exactly twice their actual size.

In a preferred embodiment, the female track members 24 are secured to the upper surfaces of the truck bed side walls 20 and the male members 26 are secured to the lower side edges of the cover or canopy. In another embodiment, this configuration may be reversed with the female track member secured to the cover or canopy and the male member secured to the upper surfaces of the truck side walls 20.

Turning now to FIG. 6, a preferred embodiment of the invention useful in slidably mounting otherwise conventional canopies on a pickup truck bed is shown. Conventionally, canopies include flat, lower, inwardly directed mounting rails along their lower side edges; the term "mounting rail" is a term of art. Such a rail is shown at 46 in FIG. 6. In the case of this invention, however, a male track member 48 is affixed directly to a lower surface 50 thereof. In a preferred form, mounting rail 46 and male track 48 are formed as a one piece extrusion, preferably an aluminum extrusion. A female track member 52 is provided and it is similar to female track member 24 discussed in detail above. This female track 52 also includes a central channel 54 which is appropriately dimensioned so that fastener heads are entirely received within track 52; thus, the possibility of an interference fit between the male track member 48 and the female track member 52 is prevented.

Of course, in any installation, two pairs of track assemblies as just described will be provided, one for the left side of the pickup truck bed and one for the right-hand side of the pickup truck bed.

Further referring to FIG. 6, mounting rail 46 includes an otherwise conventional, angled side 56 to which the canopy is mounted. Conventionally, mounting rails are also provided on otherwise conventional covers, the only difference being that the side wall 56 is vertically oriented for covers rather than angled as it is for canopies.

Figure 7:
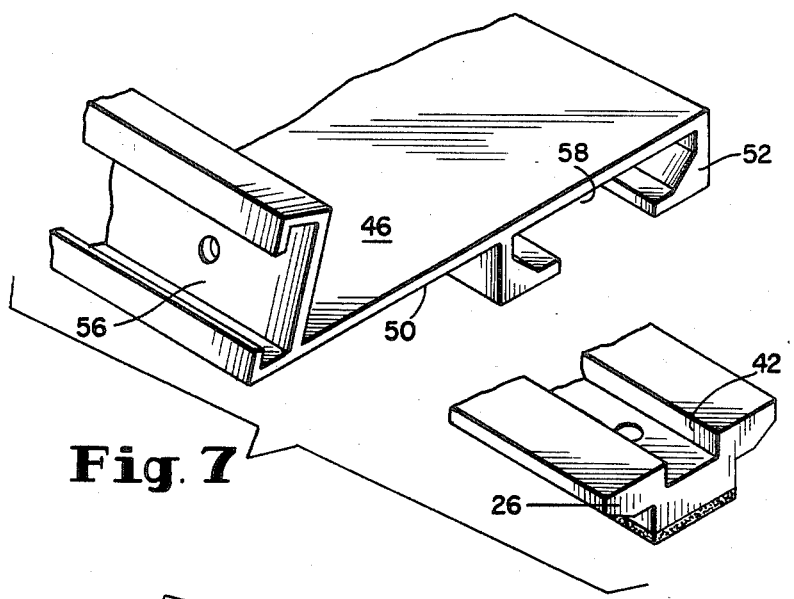
FIG. 7 is a view similar to FIG. 6 but showing the female track portion formed with a canopy mounting rail.
Figure 8:
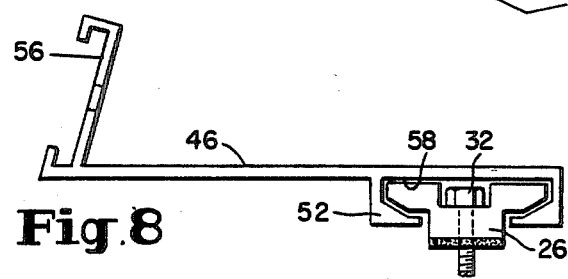
FIG. 8 is an end elevation view of the embodiment of the invention illustrated in FIG. 7.

Another form of the embodiment of the invention shown in FIG. 6 is illustrated in FIGS. 7 and 8. In this case, the female track member 52 is formed integrally with the mounting rail 46. In this case, the male track member may be the same as the male track member 26 illustrated in FIG. 4. Referring to FIG. 8, it will be noted that the under surface 50 of mounting rail 46 and the interior, horizontal web portion 58 of female track 52 are in the same plane.

Turning now to FIGS. 9 and 10, another embodiment of the invention is illustrated which is very similar to that shown in FIGS. 7 and 8. The only difference here is that the lower surface 50 of mounting rail 46 is generally coterminous with the junction of a female track member side wall 60 and, in this case, a horizontal lip 62. This is clearly shown in FIG. 10.

As can be readily appreciated, the embodiments of the invention shown in FIGS. 6-10 have particular utility in the original equipment market and the various, modified mounting rails may be constructed as an original part of the canopy. Thereafter, then, the only installation required would be to attach the mating rail members to the upper surfaces of a pickup truck bed's side walls.

Preferably, all of the embodiments of the invention described so far are manufactured as aluminum extrusions. Of course, other materials and methods of manufacture might be employed.

When the cover or canopy is not in use on the pickup truck bed, it is desirable to have the exposed track portions on the sides of the pickup truck bed covered in some fashion, both for aesthetic purposes and to protect the tracks. Such elongate covering inserts are illustrated in FIGS. 11 and 12. An elongate insert 64 is illustrated in FIG. 11 which may be made of PVC or other suitable material. The insert 64 is configured so as to be snuggly received between the angled, inwardly directed lips 38 of the female track member 24. If desired, the open space in the top central portion of insert 64 in FIG. 11 may be filled in to present a smooth, pleasant and sturdy exterior surface.

Referring to FIG. 12, an insert 66 is illustrated for use with a male track member 26. Again, insert 66 can be made of PVC or other suitable material. Insert 66 includes lower, angled portion 68 which engage male track member 26 in a snug fashion.

The invention may be embodied in other specific forms without departing from the spirit or central characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. For use in combination with a pickup truck having a cab and an open top truck body bed, the bed having upstanding, opposed, longitudinal side walls, each side wall terminating in an upper, elongated generally horizontal surface and a cover structure means dimensioned to substantially close the truck body bed, the cover structure means having lower opposed side edges generally coterminous with the side wall upper surfaces; the improvement comprising track means for slidably interengaging the side wall upper surfaces with the cover opposed side edges comprising: first elongate male track means rigidly associated with one of the truck bed side wall upper surfaces or the cover opposed side edges; second, elongate female track means rigidly associated with the other of the truck bed side wall upper surfaces or the cover opposed side edges, said male and female track means being slidably interfitted with one another whereby the cover structure means may be slid on and off the track body bed; means defining a first, generally horizontal, flat face on said male track means; means defining a second, generally horizontal flat face on an interior portion of said female track means which, with the female and male rail means in assembly, slidably engage one another as the cover structure means is slid onto and off the truck body bed; and elongate channel means formed in at least that flat face means of the elongate track means associated with truck body bed side wall upper surfaces whereby otherwise conventional headed fasteners may be employed to secure the rail means to the side wall upper surfaces, the channel means being dimensioned so that the heads of the headed fasteners are entirely received within the channel means whereby any interference fit between the sliding, cooperating male and female track means is prevented.

2. The invention as claimed in claim 1 wherein elongate channel means are formed within both of said elongate male and female track members.

3. The invention as claimed in claim 1 wherein the elongate male track means are associated with the cover means opposed side edges and the elongate female track means are associated with the truck bed side wall upper surfaces.

4. The invention as claimed in claim 1 wherein the elongate male track means are associated with the truck bed side wall upper surfaces and the elongate female track means are associated with the cover means opposed side edges.

5. The invention as claimed in claim 1 comprising, in combination, the cover means, said cover means being an otherwise conventional canopy.

6. The invention as claimed in claim 5 wherein said canopy includes mounting rail means affixed to said canopy lower opposed side edges, said mounting rail means including one of said elongate male or female track means.

7. The invention as claimed in claim 6 wherein said rail means include lower surfaces having said elongate male track means attached thereto, each elongate male track means being generally T-shaped in cross section, the bases of the stems of the T-shaped male track means being attached to said mounting rail means lower surfaces.

8. The invention as claimed in claim 7 wherein said rail means and elongate male track means are formed integrally as a one-piece extrusion.

9. The invention as claimed in claim 7 wherein each T-shaped elongate male track means includes means defining angled surfaces along the outboard, edges inner edges of the head of the T-shaped track means, each mating elongate female track means including a lower horizontal web portion, a pair of vertical side walls and a pair of inwardly directed elongate angled lips on the free ends of said female track means side walls, which face the T-shaped track means head inner edges.

10. The invention as claimed in claim 6 wherein said rail means include elongate ends having elongate female track means attached thereto, each female track means including a horizontal web portion, a pair of depending, vertical side walls and a pair of inwardly directed lips on the free ends of said female track means side walls.

11. The invention as claimed in claim 10 wherein said rail means and elongate female track means are formed integrally as a one-piece extrusion.

12. The invention as claimed in claim 10 wherein each elongate male track means is generally T-shaped in cross-section, there being means defining angled surfaces along the outboard, inner edges of the head of the T-shaped track means, the said lips of each of said mating, elongate female track means facing the T-shaped track means head inner edges.

13. The invention as claimed in claim 10 wherein said rail means and said elongate female track means are attached such that said rail means lower surface and the interior surface of said female track means horizontal web portion are generally coplanar.

14. The invention as claimed in claim 10 wherein said rail means and said elongate female track means are attached such that said rail means lower surface and the exterior junctions of said female track means side wall free ends and lips are generally coplanar.

15. The invention as claimed in claim 1 wherein the elongate male track means is associated with the truck bed side wall upper surfaces, there further being elongate covering insert means for said elongate male track means, said insert means having an interior configuration mating with the exterior configuration of said elongate male track means and generally covering the full width of said elongate male track means whereby, with said cover structure means detached from the truck bed, said covering insert means are installed onto said elongate male track means.

16. The invention as claimed in claim 1 wherein the elongate female track means is associated with the truck bed side wall upper surfaces, there further being elongate covering insert means for said elongate female track means, said insert means having an interior configuration mating with at least the upper interior portion of said elongate female track means so as to be capable of sliding interlocking engagement therewith, said insert means generally covering the full width of said elongate female track means whereby, with said cover structure means detached from the truck bed, said covering insert means are installed onto said elongate female track means.

17. For use in combination with a pickup truck having a cab and an open top truck body bed, the bed having upstanding, opposed, longitudinal side walls, each side wall terminating in an upper, elongated, generally horizontal surface and a cover structure means dimensioned to substantially close the truck body bed, the cover structure means having lower opposed side edges generally coterminous with the side wall upper surfaces, the improvement comprising: first elongate male track means rigidly associated with one of the side wall upper surfaces or the cover opposed side edges; second, elongate female track means rigidly associated with the other of the side wall upper surfaces or the cover opposed side edges, said male and female track means being slidably interfitted with one another whereby the cover structure means may be slid on and off the truck body bed; each said female track means comprising a horizontal web portion, first means defining an elongate channel centrally within said horizontal web, said channel having a predetermined depth whereby otherwise conventional headed fasteners may be employed to secure said female track means to one of the cover side edges or truck bed side wall upper surfaces with the heads of the fasteners received entirely within the channel; each said male track means including a generally horizontal, flat face which, in assembly, is in sliding contact with said female track means web portion horizontal web, and second means defining a channel with said male track face, said channel having a predetermined depth whereby otherwise conventional headed fasteners may be employed to secure said male track means to one of the cover side edges or truck bed side wall upper surfaces entirely within the channel, so that any interference fit between the sliding cooperating male and female track means is prevented.

18. The invention as claimed in claim 17 wherein said male track means is generally of trapezoid configuration in cross-section, said face and second channel means being located on and within the base of said trapezoid, said female track means, in cross-section, having an internal configuration mating the exterior of said male track means and including a pair of opposed side walls extended from the horizontal web with inwardly directed, angled lips at the free ends of the side walls.

19. The invention as claimed in claim 17 further comprising, in combination, an otherwise conventional flat cover.

20. For use in combination with a pickup truck having a cab and an open top truck body bed, the bed having upstanding, opposed, longitudinal side walls, each side wall terminating in an upper elongated generally horizontal surface and a otherwise conventional canopy dimensioned to substantially close and cover the truck body bed, the canopy having lower opposed side edges generally coterminous with the side wall upper surfaces of the truck bed, the improvement comprising: mounting rail means affixed to the canopy lower opposed side edges, each mounting rail means including a lower surface; first elongate male track means attached to the lower surfaces of said mounting rail means, each elongate male track means being generally T-shaped in cross-section, the bases of the stems of the T-shaped male track means being attached to said mounting rail means lower surfaces; second, elongate female track means rigidly associated with the truck bed side wall upper surfaces, said male and female track means being slidably interfitted with one another slidably interfitted with one another whereby the canopy may be slid on and off the track body bed; each said female track means including a generally horizontal web portion; means defining an elongate channel within each said web portion, said channel having a predetermined depth whereby otherwise conventional headed fasteners may be employed to secure said female track means to said truck bed side wall upper surfaces with the heads of the fasteners received entirely within teh said channel means whereby any interference fit between the sliding, cooperating male and female track means is prevented.

21. The invention as claimed in claim 20 further comprising in combination, an otherwise conventional canopy.

22. The invention as cliamed in claim 1 wherein said male and female track means are dimensional so as to have only a loose, sliding fit with one another whereby, after assembly with a cover or canopy and pickup truck bed, the tracks will not bind as the cover or canopy is slid onto and off of the pickup truck bed.

23. The invention as claimed in claim 17 wherein said male and female track means are dimensional so as to have only a loose, sliding fit with one another whereby, after assembly with a cover or canopy and pickup truck bed, the tracks will not bind as the cover or canopy is slid onto and off of the pickup truck bed.

24. The invention as claimed in claim 20 wherein said male and female track means are dimensional so as to have only a loose, sliding fit with one another whereby, after assembly with a coyer or canopy and pickup truck bed, the tracks will not bind as the cover or canopy is slid onto and off of the pickup truck bed.

* * * * *